United States Patent [19]

Airhart

[11] Patent Number: 4,655,314

[45] Date of Patent: Apr. 7, 1987

[54] VIBRATORY SEISMIC SOURCE FOR GENERATING COMBINED COMPRESSIONAL AND SHEAR WAVES

[75] Inventor: Tom P. Airhart, Plano, Tex.

[73] Assignee: Atlantic Richfield Company, Los Angeles, Calif.

[21] Appl. No.: 830,340

[22] Filed: Feb. 18, 1986

[51] Int. Cl.[4] .............................................. G01V 1/02
[52] U.S. Cl. .................................... 181/113; 181/114; 181/119; 181/121; 367/189
[58] Field of Search ........................... 367/189, 190, 75; 181/113, 114, 121, 401

[56] References Cited

U.S. PATENT DOCUMENTS

| | | | |
|---|---|---|---|
| 4,059,820 | 11/1977 | Turpening | 181/113 |
| 4,316,521 | 2/1982 | Chelminski | 181/114 |
| 4,321,981 | 3/1982 | Waters | 181/119 |
| 4,354,572 | 10/1982 | Martin | 181/114 |
| 4,390,077 | 6/1983 | Fulkerson | 181/114 |
| 4,421,198 | 12/1983 | Miller | 181/114 |

Primary Examiner—Charles T. Jordan
Assistant Examiner—John W. Eldred
Attorney, Agent, or Firm—Robert M. Betz

[57] ABSTRACT

A vibratory seismic surface source includes a hydraulic vibrator the energy of which is coupled into the earth through a ground contacting base plate. The vibrator is supported above and independently of the base plate so that it may be pivoted about a first rotational axis within a truck-mounted gimbal-type frame which itself is tiltable about a second horizontal rotational axis perpendicular to the first. After the vibratory axis is oriented in the desired direction the vibrator is lowered so as to contact a suitably contoured upper surface of the base plate. Inclination of the vibrator is accomplished by "push-pull" operation of pairs of oppositely-directed hydraulic cylinders.

4 Claims, 7 Drawing Figures

VIBRATORY SEISMIC SOURCE FOR GENERATING COMBINED COMPRESSIONAL AND SHEAR WAVES

BACKGROUND OF THE INVENTION

1. Field of the Invention

This invention relates generally to the field of seismic exploration and more particularly to an improved apparatus for imparting vibrational energy to the earth wherein selected combinations of compressional and shear wave energy can be generated simultaneously.

2. Description of the Prior Art

In applicant's co-pending commonly assigned U.S. Pat. application Ser. No. 826,753, filed on Feb. 6, 1986, entitled "Vibratory Seismic Source for Generating Combined Compressional and Shear Waves" there is described an apparatus for coupling vibratory energy into the earth at a given position on the earth's surface. As described in the subject application a hydraulic vibrator for providing reciprocal vibrations along a vibratory axis is supported above and independently of an earth-contacting base plate. Preferably the vibrator is of a conventional type wherein a reaction mass is slidably mounted on a double rod end piston. Introduction of hydraulic pressure within such vibrator produces significant reciprocation of the piston. Means are provided for variably orienting the vibrator so that such vibratory axis is directly along any predetermined slant path. Further means are provided for lowering the vibrator in the direction of such vibratory axis so that one rod end makes contact with the base plate. Actuation of the vibrator in such contact position then transfers vibrational energy into the base plate by means of which such energy is coupled into the earth. As described in the application the vibrator is preferably mounted upon a rotatable turntable which may, for example, be supported horizontally on the bed of a transport vehicle. The turntable is provided with a central aperture through which the vibrator may be maneuvered in order to contact the base plate. Hydraulic cylinders adjustably interconnected between the turntable and the vibrator vary the inclination of the vibratory axis by rotating the vibrator about an axis parallel to the turntable plane. Rotation of the turntable about its own vertical axis varies the azimuthal direction of such vibrator's axis.

SUMMARY OF THE INVENTION

The present invention contemplates further improved means for coupling the energy of a vibrator into the earth wherein the vibrator provides reciprocal vibrations along a variably orientable vibratory axis. A vibrator gimbal-type mounting frame is supported above a base plate coupled to the ground such that the frame is pivotable about a first rotational axis parallel to the plane of the base plate. The vibrator is pivotally supported within the frame so as to enable limited rotation of the vibrator about a second rotational axis perpendicular to the first rotational axis. Combined pivotal movement of the frame and the vibrator about such rotational axes aligns the vibrational axis with any desired direction. In a more limited aspect of the invention the mounting frame is carried on a truck or other transport vehicle. Pivotal movement of the frame about the first rotational axis is effected by hydraulic cylinder means adjustably secured between the vehicle and the frame. Pivotal movement of the vibrator itself about the second rotational axis is effected by further hydraulic cylinder means adjustably secured between the frame and the vibrator. The vibrator may be provided with means cooperation with its frame support whereby the vibrator position can be shifted along its vibratory axis so as to contact the base plate for vibrational energy transfer.

It is therefore a general object of this invention to provide an improved seismic energy vibrator capable of generation combined compressional and shear waves.

It is a more particular object of this invention to provide easily controllable means for varying the angular orientation of the vibratory path along which energy is coupled into the earth with such vibrator.

Other objects and advantages of this invention will become apparent from a consideration of the following detailed description taken in conjunction with the accompanying drawings.

DETAILED DESCRIPTION OF THE PREFERRED EMBODIMENT

Figure 1:
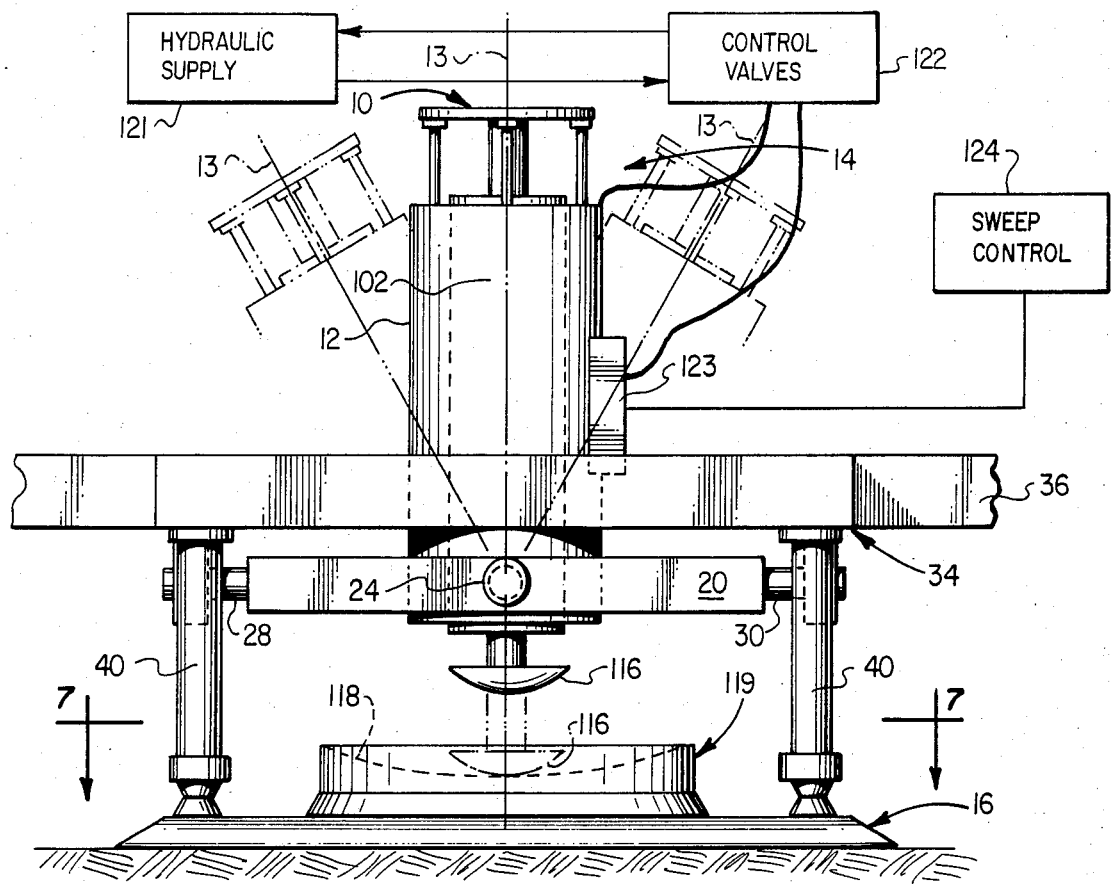
FIG. 1 is an elevational side view in accordance with the preferred embodiment of this invention illustrating a hydraulic vibrator adjustably positioned above a base plate positioned on the earth's surface.

Referring now to FIG. 1, an apparatus is shown for practicing the invention utilizing a single vibrating mass. Cylindrical vibrator 10 may be of the type utilizing a reaction mass mounted for reciprocal motion on a double rod end pistion under hydraulic control, all as well known to the art. An example of such device is fully described and shown in U.S. Pat. No. 3,159,233 issued in the name of F. Clynch, et al., filed on Dec. 1, 1964 and entitled "Seismic Transducer Construction". Vibrator 10 is carried within hollow cylindrical outer housing 12 and oriented such that the vibratory axis 13 of vibrator 10 coincides with the longitudinal axis of housing 12. Vibrator 10 and housing 12 form in combination a vibrator assembly 14 which is adjustably supported above and independently of base plate 16 for rotation about two mutually perpendicular axes, thereby determining the directional orientation of vibratory axis 13. After vibratory axis 13 is adjusted to coincide with the desired direction, vibrator 10 may be drawn downwardly with respect to housing 12 so that the lower end of vibrator 10 contacts base plate 16. In such position of contact vibrator 10 is then activated so as to transfer vibratory energy to base plate 16 in the desired direction for injection into the earth.

Figure 2:
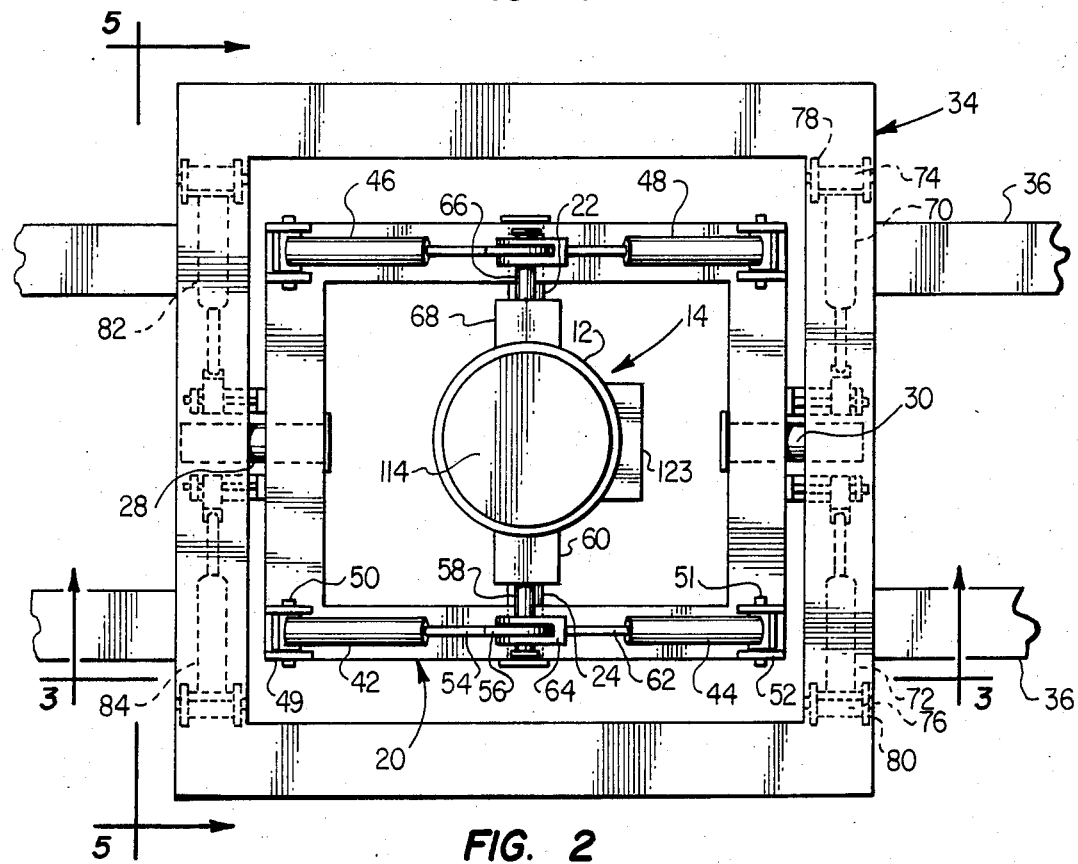
FIG. 2 is a plan view of the apparatus illustrated in FIG. 1 showing a vibrator supported within an inner truck-mounted frame and their mutually perpendicular pivot axes.

FIG. 2 shows the "gimbal" type of fixture whereby variation of the path of the vibratory axis 13 is accomplished. Vibratory assembly 14 is suspended within a tiltable rectangular inner frame 20 for rotation on a pair of inwardly extending axles 22 and 24. Inner frame 20 is provided with a further pair of axles 28 and 30 which extend at right angles to axles 22 and 24 and which are interconnected with fixed outer vehicle frame 34. As shown in FIG. 1 and 2, frame 34 is rigidly attached to the longitudinal chassis members 36 of a transport vehicle (not shown), whose weight is transferred at least in part to base plate 16 by means of adjustable shock-isolated upright supports 40.

It is apparent that the above described cooperating elements provide vibratory assembly 14 with two degrees of rotational freedom. In other words, assembly 14 may be tilted fore and aft with respect to the transport vehicle by rotation on axles 22 and 24 and from side to side by rotation of inner frame 20 on axles 28 and 30. The allowable tilt in any of these four directions depends upon the design of vibrator assembly 14 and that of the transport vehicle itself, a maximum of thirty (30) degrees variation from the vertical in any direction being found sufficient for much important geophysical work.

FIG. 2 further illustrates the means by which the tilt motion of vibrator assembly 14 and inner frame 20 are accomplished. Extending along opposite sides of assembly 14 and mounted on inner frame 20 are two pairs of opposing or oppositely directed hydraulic cylinders. One such pair consists of cylinders 42 and 44 located on one side of assembly 14, the other pair consisting of cylinders 46 and 48 located on the opposite side of assembly 14. The construction and operation of cylinders 42 and 44 is exactly the same as that of cylinders 46 and 48 and thus only the former will be described in detail. Cylinder 42 is pivotally mounted within bracket 49 for rotation about pivot pin 50. Simarily, cylinder 44 is rotatable about pivot pin 51 situated within bracket 52 located opposite bracket 49. The upper end of piston rod 54 of cylinder 42 terminates in a rod clevis 56 which surrounds tilt pin 58, which in turn is rigidly attached to and projects outwardly from thrust frame 60 mounted on the external surface of housing 12. In like manner piston rod 62 of cylinder 44 terminates in a rod clevis 64 which also surrounds tilt pin 58 and dovetails with the end of clevis 56.

Figure 3:
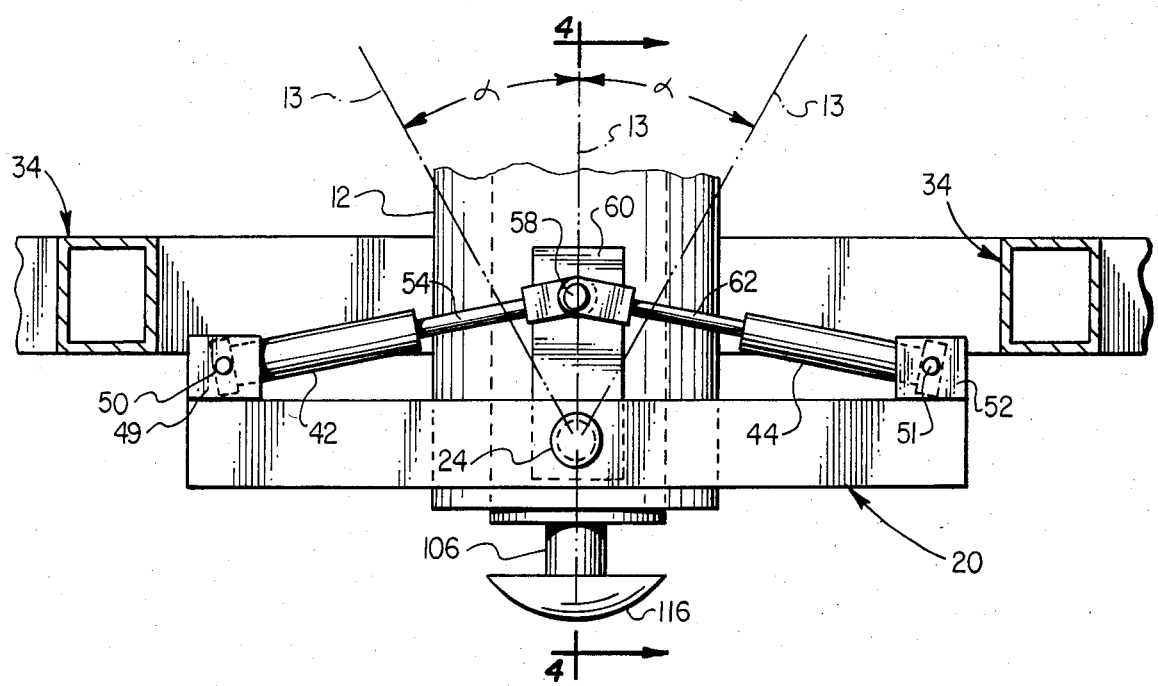
FIG. 3 is a detailed side view of the apparatus of FIG. 1 showing one pair of vibrator-tilting hydraulic cylinders.
Figure 4:
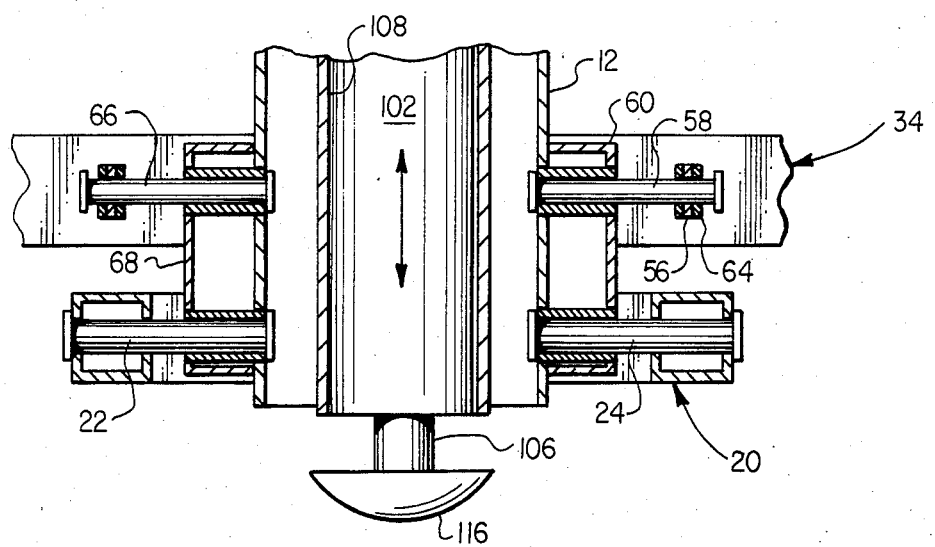
FIG. 4 is a detailed vertical section taken along the line 4—4 in FIG. 3 showing the mounting brackets for supporting the vibrator pivot axles and the vibrator tilt pins.

As best seen in FIG. 3 and 4, tilt pin 58 is vertically offset above axle 24 so that the piston rods 54 and 62 slant upwardly in opposite directions from inner frame 20 to engage tilt pin 58. By means well known to the art suitable control signals may be provided to enable operation of cylinders 42 and 44 in "push-pull" relation in either direction, thereby causing vibrator assembly 14 to tilt or rotate on axles 22 and 24 in either sense, such as through an angle $\alpha$. In order to equalize the rotational forces generated in the manner described on both sides of assembly 14 and thereby eliminate undersirable twisting forces, cylinders 42 and 44 are operated in tandem with cylinders 46 and 48 on the opposite side of assembly 14. Thus, tilt pin 66 fixed to thrust frame 68 (FIG. 2) is engaged by cylinders 46 and 48 so as to enable application of a torque to assembly 14 complementing the tilting force described above.

Figure 5:
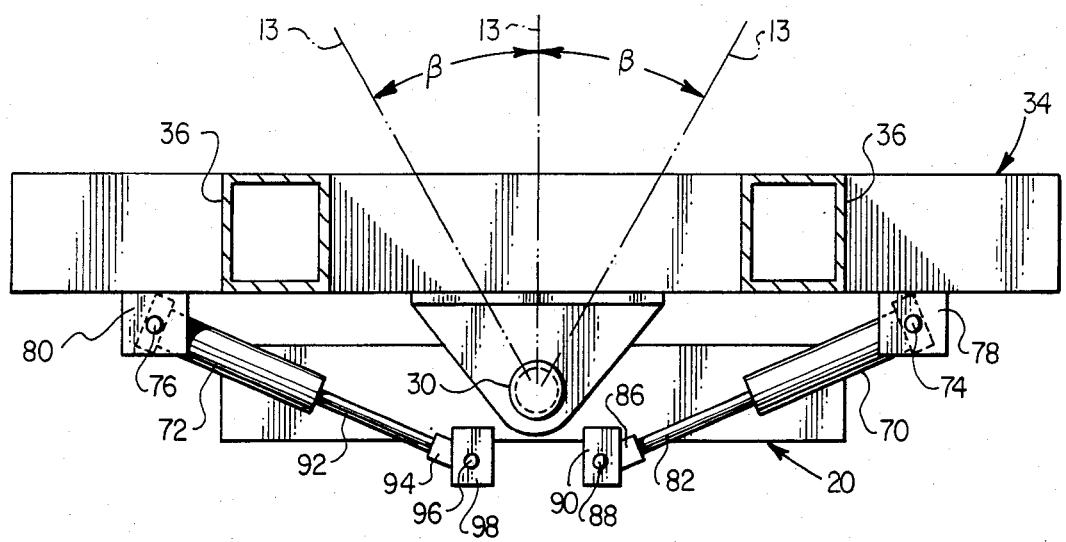
FIG. 5 is a detailed rear view of the apparatus of FIG. 1 illustrating one set of hydraulic cylinders for pivoting the inner frame about an outer fixed vehicle frame.

The manner in which inner frame 20 may be tilted or rotated on axles 28 and 30 from side to side is best understood with further reference to FIG. 2 and to the detail of FIG. 5. As shown in FIG. 5 a pair of hydraulic cylinders 70 and 72 are rotatably respectively about parallel axes on pivot pins 74 and 76 carried by brackets 78 and 80 depending from fixed frame 34. Another pair of such oppositely directed hydraulic cylinders 82 and 84 (as shown in phantom in FIG. 2) are disposed on the opposite or front side of inner frame 20. They are constructed and operated in an identical manner to cylinders 70 and 72 and therefore will not be described in great detail. Piston rod 82 of cylinder 70 terminates in a knuckle 86 which is rotatable about pivot pin 88 fixed to bracket 90 depending from inner frame 20. Similarly, piston rod 92 of cylinder 72 terminates in knuckle 94 rotatable about pivot pin 96 fixed to dependent bracket 98. In fashion similar to that described to effect tilt of vibrator assembly 14 opposite or push-pull operation of hydraulic cylinders 70 and 72 in tandem with the parallel pair of hydraulic cylinders 82 and 84 produces a tilt or rotation of inner frame 20 in either sense on axles 28 and 30 such as through an angle $\beta$.

Since the distance between tilt pins 58 and 66 and their respective pivot axles 24 and 22 is small relative to the total axial length of vibration assembly 14, the required "stroke" length for hydraulic cylinders 42, 44, 46 and 48 is short. This enables such hydraulic cylinders to perform most efficiently and decreases the time required for tilting assembly 14. Similar advantages result from locating the points at which tilt forces are applied to frame 20 close to axles 28 and 30.

Figure 6:
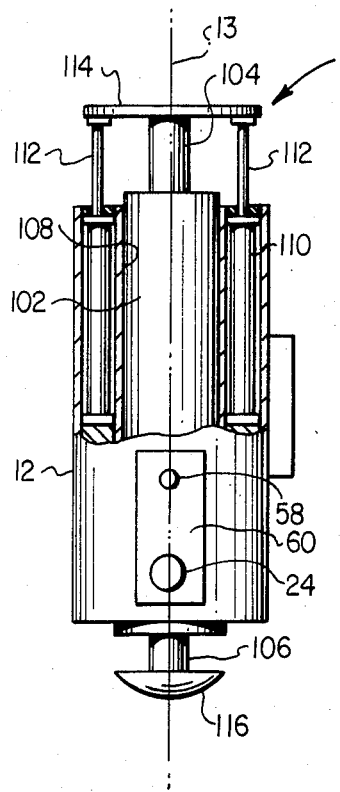
FIG. 6 is a detailed elevational view of the vibrator of FIG. 1 with the external support housing shown partially in section.
Figure 7:
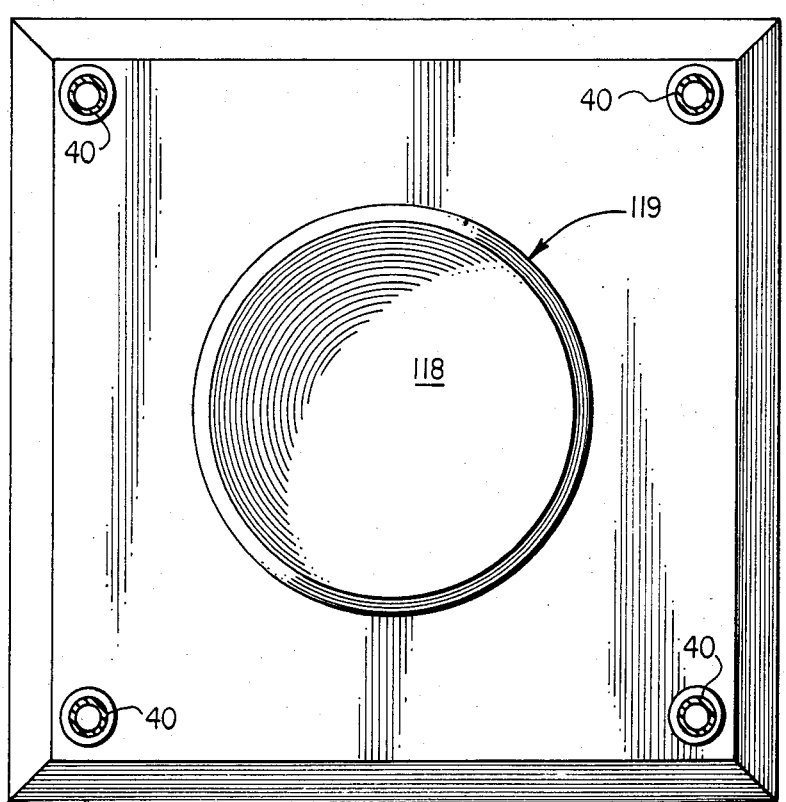
FIG. 7 is a plan view taken along the line 7—7 in FIG. 1.

Turning now to FIG. 6 means are illustrated for bringing vibrator 10 into contact with base plate 16. As noted previously vibrator 10 may be of conventional construction employing a reaction mass 102 slidably mounted on a double rod end piston (not shown) having outwardly projecting rod ends 104 and 106. Vibrator 10 is slidably supported within open ended bore 108 of housing 12 so that it is permitted limited axial movement therein. A plurality of spaced apart hydraulic cylinders 110 are fixed within housing 12 so that their respective piston rods 112 extend upwardly to engage a transverse plate 114 fastened to the top of rod end 104. Retraction of piston rods 112 pulls vibrator 10 downwardly until rounded cap 116 on the bottom of lower rod end 106 contacts base plate 16. As best seen in FIG. 1 and 7 cap 116 is adapted to contact upper hemispherically concave surface 118 of cylindrical elevation 119 of base plate 16. Surface 118 is perferably contoured such that it forms a portion of a sphere whose center intersects vibratory axis 13 no matter what its orientation. This effect will be achieved if axles 22, 24, 38 and 30 are substantially coplanar. In this way it is possible to insure that the path of vibratory axis 13 is perpendicular to surface 118 at all times for most efficient transfer of vibratory energy to base plate 16 in the desired direction.

Frequency and sweep rate control of the apparatus of this invention may be accomplished by means well known to those skilled in this art utilizing hydraulic supply 121 and control valves 122. Servo valves 123 may then be operated by signals from sweep control 124 so as to provide reciprocation of reaction mass 102 and produce corresponding vibrational motion of base plate 16 for coupling into the earth.

It should now be appreciated that with the apparatus of this invention it is possible to generate and remotely record simultaneously seismic compressional waves and shear waves of both SH and SV type through the use of conventional 3-element orthogonal geophones. The relative amplitudes of the compressional and shear waves so generated may be varied by selecting any desired combination of tilt angles $\alpha$ and $\beta$ as described above.

It should be understood that the particular form of vibrator described in this application as well as the design of the mounting frames and the means for bringing vibrator 10 into contact with base plate 16 are illustrative only and not to be regarded in any sense as limiting the scope of the apparatus of this invention as more particularly set forth in the appended claims.

What is claimed is:

1. Apparatus for imparting combined compressional and shear wave seismic vibrations to the earth comprising:
   (a) a base plate for coupling vibrational energy into the earth;
   (b) a frame;
   (c) means for pivotally supporting said frame above said base plate in spaced relation thereto so as to enable limited rotation of said frame about a first rotational axis extending parallel to the plane of said base plate;
   (d) a vibrator for providing reciprocal vibrations along a vibratory axis;
   (e) means for pivotally supporting said vibrator within said frame such as to enable limited rotation of said vibrator about a second rotational axis perpendicular to said first rotational axis and extending in the plane of said frame;
   (f) means for tilting said frame and said vibrator respectively about said first and second rotational axes, until said vibratory axis coincides with a predetermined direction;
   (g) means adjustably secured between said frame and said vibrator for thereafter shifting the position of said vibrator in the direction of said vibrating axis so that said vibrator contacts said base plate; and
   (h) means for actuating said vibrator in said position of contact so as to transfer vibrational energy to said base plate.

2. Apparatus as in claim 1 wherein said vibrator is a hydraulic vibrator.

3. Apparatus as in claim 1 wherein said frame is supported on a transport vehicle.

4. Apparatus as in claim 3 wherein said means for rotating said frame and said vibrator respectively about said first and second rotational axes comprises:
   (a) a first pair of oppositely directed hydraulic cylinders adjustably secured between said vehicle and said frame such that operation of said first pair of hydraulic cylinders in opposition effects rotation of said frame about said first rotational axis; and
   (b) a second pair of oppositely directed hydraulic cylinders adjustably secured between said frame and said vibrator such that operation of said second pair of hydraulic cylinders in opposition effects rotation of said vibrator about said second rotational axis.

* * * * *